(12) United States Patent
McClintic

(10) Patent No.: US 8,960,380 B2
(45) Date of Patent: Feb. 24, 2015

(54) LIQUID-COOLED BRAKE ASSEMBLY WITH REMOVABLE HEAT TRANSFER INSERT

(71) Applicant: Oil States Industries, Inc., Arlington, TX (US)

(72) Inventor: Barry S. McClintic, Mansfield, TX (US)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 13/731,477

(22) Filed: Dec. 31, 2012

(65) Prior Publication Data

US 2013/0180808 A1 Jul. 18, 2013

Related U.S. Application Data

(60) Provisional application No. 61/585,947, filed on Jan. 12, 2012.

(51) Int. Cl.
| F16D 55/02 | (2006.01) |
| F16D 63/00 | (2006.01) |
| F16D 55/36 | (2006.01) |
| F16D 65/12 | (2006.01) |
| F16D 65/853 | (2006.01) |
| F16D 65/02 | (2006.01) |
| F16D 65/78 | (2006.01) |
| F16D 121/04 | (2012.01) |

(52) U.S. Cl.
CPC ............... *F16D 63/00* (2013.01); *F16D 55/36* (2013.01); *F16D 65/12* (2013.01); *F16D 65/853* (2013.01); *F16D 2065/132* (2013.01); *F16D 2065/1328* (2013.01); *F16D 2065/784* (2013.01); *F16D 2121/04* (2013.01); *F16D 2200/0052* (2013.01)

USPC ................. 188/71.6; 188/264 D; 192/70.12; 192/113.3

(58) Field of Classification Search
USPC ............ 188/71.5, 264 C, 264 D, 264 F, 71.6; 192/58.2, 85.37, 85.4, 58.64, 70.12, 192/85.61, 113.1, 113.21, 113.22, 113.34, 192/113.36, 113.3
See application file for complete search history.

(56) References Cited

U.S. PATENT DOCUMENTS

| 2,373,572 | A | 4/1945 | Lambert |
| 4,609,076 | A | 9/1986 | Collins et al. |
| 4,703,623 | A | 11/1987 | Dalibout et al. |
| 4,907,683 | A | 3/1990 | Patel |
| 5,085,295 | A | 2/1992 | Wautelet et al. |
| 5,451,779 | A | 9/1995 | Spross et al. |
| 5,908,092 | A | 6/1999 | Walter et al. |
| 6,264,009 | B1 | 7/2001 | Johnson |
| 6,269,916 | B1 | 8/2001 | Daugherty, Jr. |
| 6,321,882 | B1 | 11/2001 | Heckel et al. |
| 6,481,542 | B2 | 11/2002 | Giering et al. |
| 6,506,138 | B2 | 1/2003 | Panizzolo |
| 6,532,637 | B1 | 3/2003 | Niespodziany et al. |

(Continued)

*Primary Examiner* — Christopher Schwartz
(74) *Attorney, Agent, or Firm* — Morgan, Lewis & Bockius LLP

(57) ABSTRACT

A brake for a rotating member is disclosed. The brake is used with a liquid coolant, and includes a housing for containing the liquid, a stationary element disposed in the housing, a wear plate disposed on the stationary element, a friction element coupled to the rotating member for contacting the wear plate, and a removable heat transfer insert disposed adjacent the wear plate and in fluid communication with the coolant, the heat transfer insert consisting of a non-galvanic material.

22 Claims, 6 Drawing Sheets

(56) References Cited

U.S. PATENT DOCUMENTS

| | | |
|---|---|---|
| 6,638,883 B2 | 10/2003 | Gaffney et al. |
| 6,743,002 B1 | 6/2004 | Millar et al. |
| 7,287,969 B2 | 10/2007 | Fugle |
| 7,344,199 B2 | 3/2008 | Meyer |
| 7,591,349 B2 | 9/2009 | McConkie et al. |
| 7,604,104 B2 | 10/2009 | Tekesky |
| 7,845,919 B2 | 12/2010 | Fukuchi et al. |
| 2004/0035658 A1* | 2/2004 | Ehnert ................ 188/251 A |
| 2009/0065320 A1* | 3/2009 | Culmer ................ 192/70.12 |
| 2009/0084639 A1* | 4/2009 | Colegrove ................ 188/26 |
| 2010/0270117 A1* | 10/2010 | Boonpongmanee ......... 192/58.2 |
| 2013/0341136 A1* | 12/2013 | Boonpongmanee et al. ................ 188/264 D |

\* cited by examiner

LIQUID-COOLED BRAKE ASSEMBLY WITH REMOVABLE HEAT TRANSFER INSERT

RELATED APPLICATIONS

The present application claims the benefit of U.S. Patent Application Ser. No. 61/585,947 filed on Jan. 12, 2012, all of which is herein incorporated by reference in its entirety.

BACKGROUND

1. Field of the Invention

The present invention relates to liquid-cooled brakes, and more particularly, to a fluid-operated liquid-cooled brake assembly used to control or stop a rotatable shaft. 2.

2. Description of the Related Art

Fluid-operated brake devices are used in a wide range of industrial applications. Such devices typically comprise a brake assembly connected to a rotatable shaft, with the shaft extending axially through the center of the brake assembly. The brake assembly also typically includes brake pads or other means utilizing frictional forces to control or stop the rotatable shaft, with the frictional forces controlled through the application of pneumatic pressure. Because the frictional forces of braking can generate large quantities of heat, such brakes often use a flow of liquid (e.g., oil, glycol or water), through the brake assembly as a way to dissipate the heat generated during the braking process.

The oil and natural gas industry is one field in which such fluid-operated liquid-cooled brakes are frequently used. In the oil and natural gas industry, drilling rigs drill wells deep into the earth not only to identify geologic reservoirs but also to create wells that allow the extraction of oil or natural gas from those reservoirs. The drilling rigs use drill strings made of multiple pipe lengths to make the holes in the earth. It is sometimes necessary to remove the drill string from the well bore in a process called tripping pipe, or making a round trip, or simply making a trip. This is done by physically disconnecting, when pulling out of the hole, every other 2 or 3 joints of drill pipe at a time, and then stacking them vertically in a rack in the derrick. During this process, the drill string must be suspended while the pipe lengths are racked. Drilling rigs use liquid-cooled brake assemblies attached to a draw works reel to hold the drill string while making the trip. The brakes are robust, as the drill string is heavy.

Liquid-cooled brake assemblies used in the oil and natural gas industry typically have friction disks that engage a wear plate and convert the potential energy of the heavy drill stem to heat generated through friction. The wear plates become quite hot from the frictional forces, and are cooled with a circulating coolant, most often water, glycol or oil, that passes over a heat transfer insert disposed between the wear plate and a mounting flange or reaction plate. Typical heat transfer inserts are constructed of steel and are formed with many small vertical projections such as nubs or pegs or pins. The nubs permit coolant to circulate therearound in order to transfer heat away from the wear plate.

However, the nubs corrode over time, especially when water is used as the coolant, as the water reacts with the steel. In addition, the nubs suffer from galvanic corrosion due to the use of dissimilar metals between the nubs and the wear plate, mounting flange or reaction plates. The heat transfer inserts, which are made of steel, are disposed adjacent wear plates, which are often made of copper. If water is used, it acts as an electrolyte and thus, a galvanic couple is established. The potential difference between the dissimilar metals is one factor in the accelerated attack on the heat transfer insert. Less heat is conveyed away from the wear plate as the nubs corrode, making the brake less effective as the corrosion progresses.

Corroded heat transfer inserts can be repaired. In usual industry practice, portions of the heat transfer insert are removed via sand-blasting or a similar process, and new steel is welded in place of the removed portions. The new nubs are then machined to be flush with respect to each other and the surrounding surfaces. The repair process is expensive and time consuming, and requires a sophisticated machine shop with large and expensive equipment. The repairs are not suited to be easily performed in the field, where most oil and natural gas drilling rigs are employed. An additional cost to be considered in repairing a liquid-cooled brake is the downtime of a drilling rig while the repair is being performed.

There is thus a need for a liquid-cooled brake assembly that can be easily and quickly repaired when a heat transfer insert is corroded or worn. There is also a need for a brake assembly that can be repaired in the field where it is used. There is a further need for an inexpensive repair for a liquid-cooled brake assembly.

SUMMARY OF THE INVENTION

In accord with the present invention, a brake for a rotating member comprises a housing for containing a liquid coolant, a stationary element disposed in the housing, a wear plate disposed on the stationary element, a friction element coupled to the rotating member for contacting the wear plate, and a removable heat transfer insert disposed adjacent the wear plate and in fluid communication with the coolant, the heat transfer insert consisting of a non-metallic material.

Further in accord with the present invention, a brake for a rotating member comprises a housing for containing a liquid coolant, a mounting flange for the housing, first and second mounting elements disposed within the housing, a pressure plate disposed within the housing, a wear plate disposed on each of the mounting elements, the mounting flange, and the pressure plate, a plurality of friction elements coupled to the rotating member for contacting the wear plates, a removable composite heat transfer insert disposed adjacent each of the wear plates and in fluid communication with the liquid, the composite heat transfer inserts consisting of a carbon fiber/phenolic epoxy composite material, and a piston for axial movement of the pressure plate, the first and second mounting elements, and the mounting flange.

Still further in accord with the present invention, a brake for a rotating member has a removable heat transfer insert. The brake is used with a coolant, and has a housing for containing the coolant, a stationary element disposed within the housing, a wear plate disposed on the stationary element, and a friction element coupled to the rotating member for contacting the wear plate. The removable heat transfer insert is disposed adjacent the wear plate and in fluid communication with the coolant, and consists of a non-galvanic composite material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
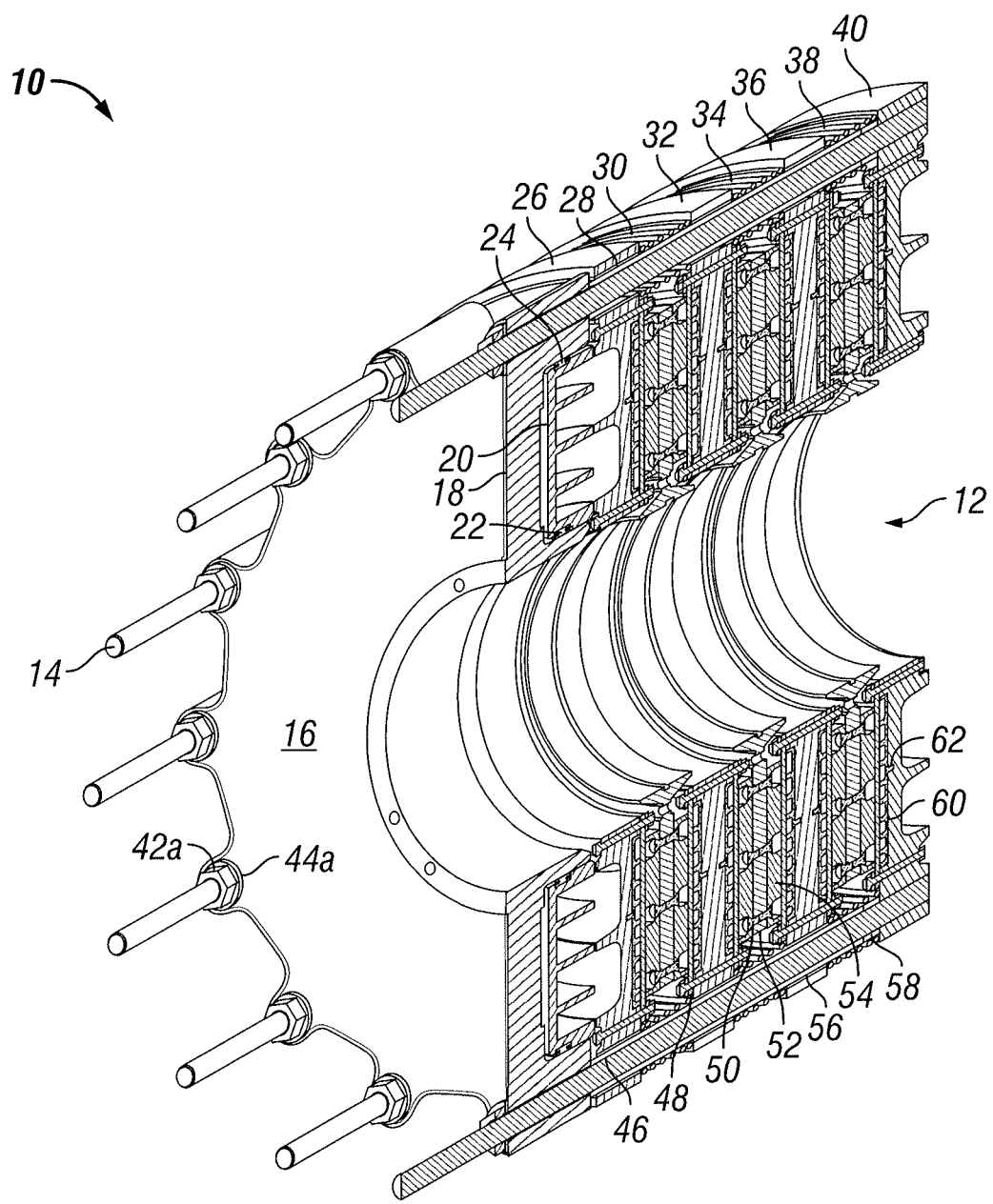
FIG. 1 is a perspective view of a liquid-cooled brake in accord with the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2:
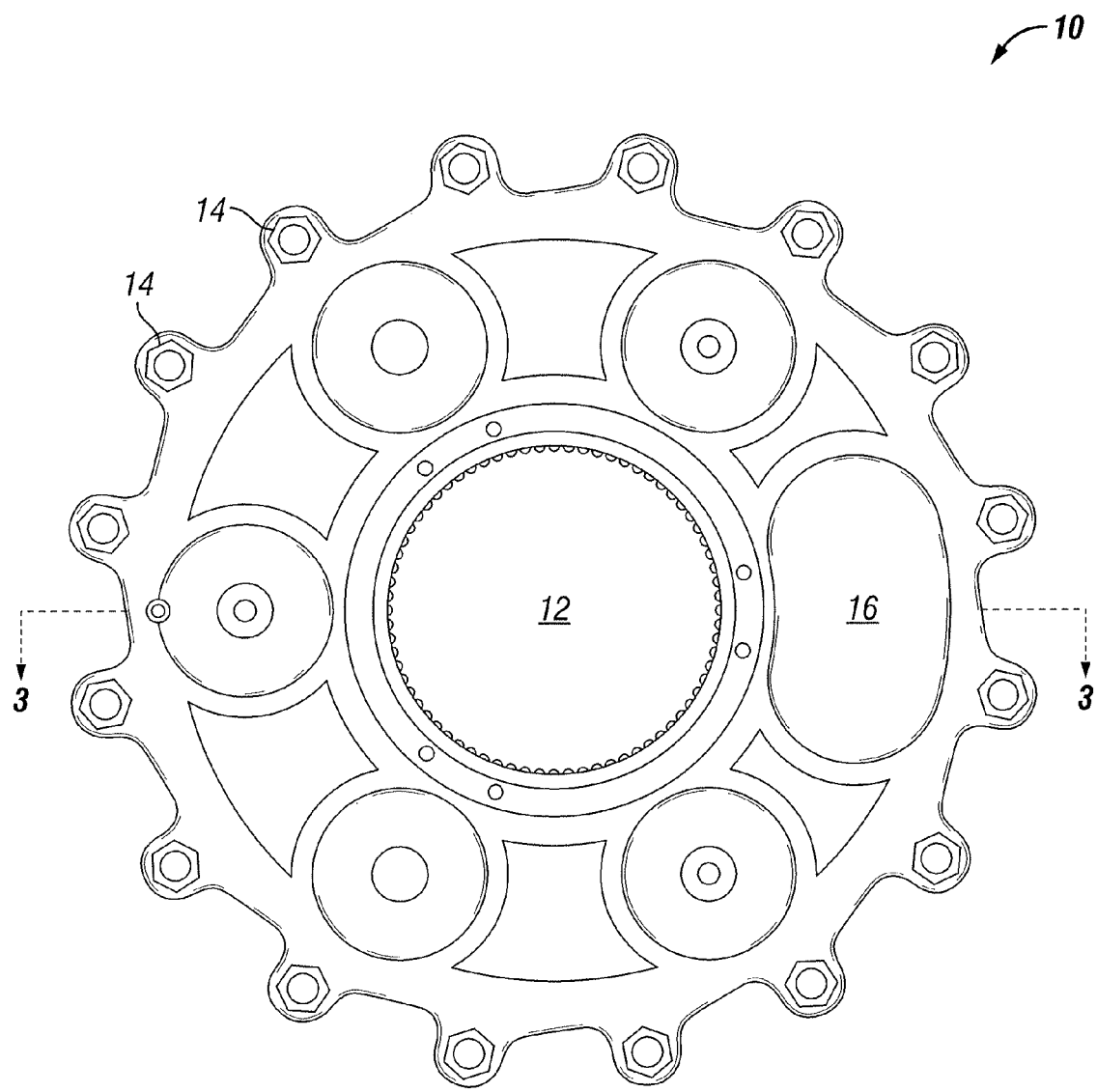
FIG. 2 is an end view of a liquid-cooled brake in accord with the present invention.
Figure 3:
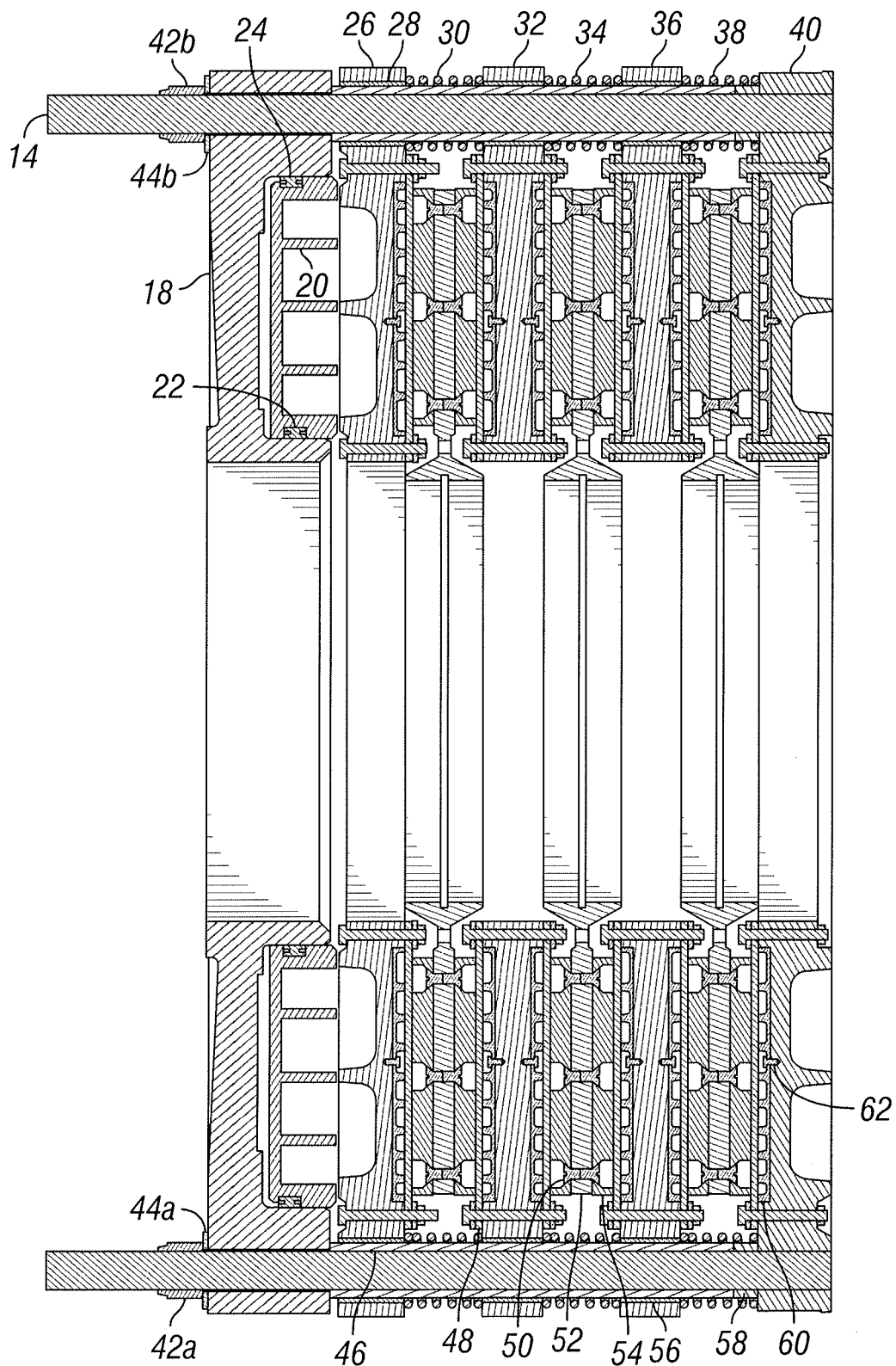
FIG. 3 is a cross-sectional view of the embodiment of FIG. 2 taken along the lines 3-3 as viewed in the direction indicated by the arrows.

Turning to the drawings, and initially to FIGS. 1, 2 and 3 thereof, there is depicted a liquid-cooled brake 10 in accordance with the invention. Brake 10 is coupled to a rotating member, such as a reel in a draw works used on an oil or gas drilling rig. Brake 10 typically receives the rotating member through aperture 12. A friction-tight coupling between the member and the brake 10 secures brake 10 to the rotating member. A plurality of bolts or studs 14 are disposed about the periphery of brake 10 and secure together the elements of a housing 16 of brake 10.

Brake 10 comprises a cylinder 18 and a piston 20 disposed in a cavity formed therein. An inner seal 22 and an outer seal 24 provide sealing engagement between piston 20 and cylinder 18. Piston 20 engages a pressure plate 26 and provides axial movement thereof in response to pneumatic pressure applied to piston 20. A bushing 28 disposed in pressure plate 26 engages a release spring 30, which in turn engages a first reaction plate 32. A second release spring 34 is disposed between first reaction plate 32 and a second reaction plate 36. A third release spring 38 is disposed between second reaction plate 36 and a mounting flange 40. Springs 30, 34, 38 normally bias pressure plate 26, release plates 32, 36, and mounting flange 40 out of contact with each other.

Brake 10 includes locknuts 42a, 42b, securing stud 14 to cylinder 18. Flat washers 44a, 44b are disposed between locknuts 42a, 42b, respectively, and cylinder 18. Stud 14 is disposed within a clamp tube 46. A wear plate 48, consisting primarily of copper, is disposed adjacent reaction plate 32. A flat head screw 50 clamps friction disk core 52 to a friction block, pad or disk 54 on either side thereof. It will be appreciated that friction disk core 52 is an annular-shaped member extending about the axial diameter of brake 10, and commonly consists of steel. A bushing 56 is disposed about stud 14. A wear spacer 58 is located on stud 14 to accommodate wear in brake 10 and engages release spring 38 and mounting flange 40. Screws 62 secure heat transfer inserts 60 and wear plates 48 to pressure plate 26, reaction plates 32, 36, and mounting flange 40. The pneumatic pressure from an external source (not shown) applies pressure to piston 20 to bring pressure plate 26, release plates 32, 36 and mounting flange 40 into contact with each other, whereby friction blocks 54 engage wear plates 48.

Figure 4:
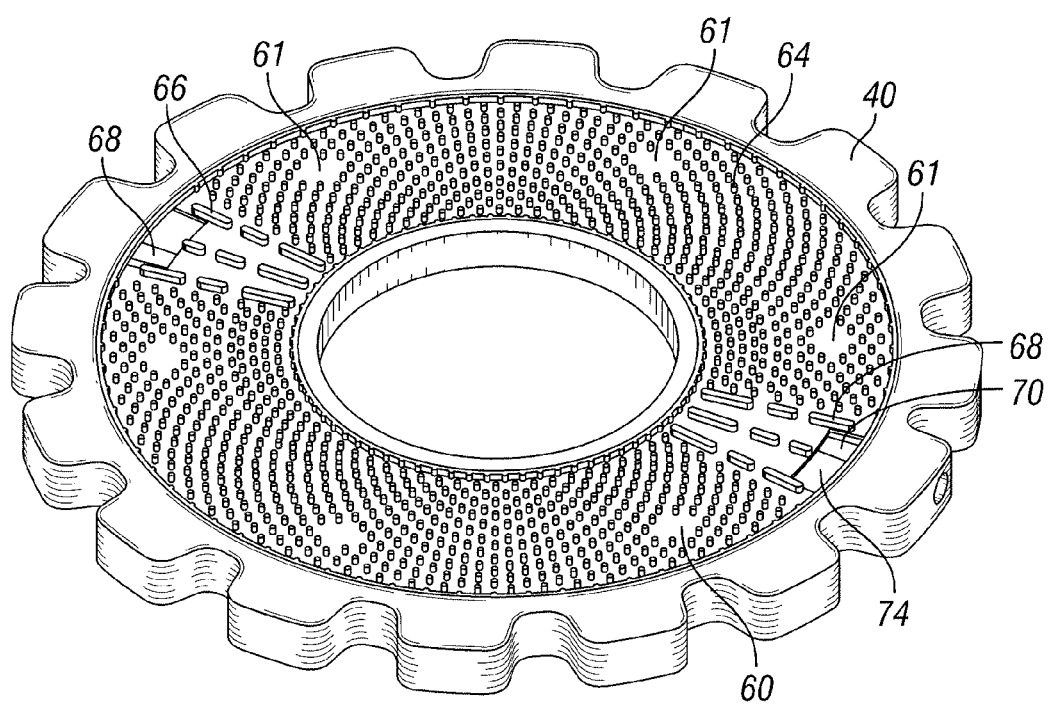
FIG. 4 is a perspective view of a removable heat transfer insert of the present invention.

Turning now to FIG. 4, a mounting flange 40 is shown with a removable composite heat transfer insert 60. Rather than forming the mounting plate and heat transfer insert as a single piece, as known in the art, such that worn or corroded portions of the heat transfer insert must be removed via sand-blasting or other similar process, removable heat transfer insert 60 is formed as a separate part. Accordingly, mounting flange 40 is formed with a cavity dimensioned to accommodate removable composite heat transfer insert 60. As more fully discussed hereinbelow, when removable composite heat transfer insert 60 becomes worn or corroded, the brake assembly may be repaired by simply removing removable composite heat transfer insert 60 and replacing it with a new insert. Such a repair may be performed in the field and does not require the complex, time-consuming, and expensive process that has traditionally been used to repair brake assemblies in the past.

Removable composite heat transfer insert 60 functions to transfer heat generated by friction between friction block 54 and wear plate 48. Removable composite heat transfer insert 60 consists of a carbon fiber/phenolic epoxy composite material, as discussed more fully hereinbelow. Removable composite heat transfer insert 60 is formed by known fabrication methods and includes a plurality of nubs or pegs or pins 64. Nubs 64 are formed on a reverse face of removable composite heat transfer insert 60 facing, mounting flange 40, reaction plates 32, 36, and pressure plate 26, respectively. Removable composite heat transfer insert 60 has an obverse face in contact with wear plate 58. Nubs 64 are upstanding from removable composite heat transfer insert 60 and are generally arranged in a field of equally spaced concentric circles about the reverse face of removable composite heat transfer insert 60, with the exception of a plurality of equally spaced, small circular fields 61 disposed approximately equidistant between the center of composite heat transfer insert 60 and the outer peripheral edge 74 thereof. It will be appreciated from FIG. 4 that, in the illustrated embodiment, nubs 64 are of uniform height and diameter and are arranged uniformly across the surface of removable composite heat transfer insert 60; however, other shapes of nubs 64 and arrangements upon the face of removable composite heat transfer insert 60 will be suggested to those of skill in the art, depending upon the desired heat transfer characteristics of composite heat transfer insert 60. In the illustrated embodiment, ridges 66 are formed on the reverse face of removable composite heat transfer insert 60 in a generally diametric direction, i.e., ridges 66 point generally towards the center of the circle formed by removable composite heat transfer insert 60. Ridges 66 thus form a channel 68 through a portion of the field of nubs 64 disposed on removable composite heat transfer insert 60 whereby the coolant, generally water, but other liquids such as glycol or oil may also be used, flows from outside housing 16 onto the reverse face of removable composite heat transfer insert 60, across nubs 64, and out of housing 16 through a channel 70 formed by generally diametrically disposed ridges 72. As noted before in connection with nubs 64, different arrangements of ridges 66, 72 and channels 68, 70 will be suggested, depending upon the desired heat transfer characteristics of removable composite heat transfer insert 60. Composite heat transfer unit 60 may be formed with a slot or notch design 74 formed therein to channel the flow of coolant thereacross in a desired manner.

Removable composite heat transfer insert 60 may be made of any suitable material. In one practical embodiment, removable composite heat transfer insert 60 was a 30/70 carbon fiber/phenolic epoxy composite material. The carbon fiber was assumed to be short fiber, random orientation, standard modulus fiber. Average material property values were used for each of these materials, and the rule of mixtures was used to find approximate material values for the composite were as follows:

$$p_c = p_m V_m + p_f V_f = (0.0462 \text{ lb/in}^3)(0.7) + (0.0643 \text{ lb/in}^3)(0.3) = 0.05163 \text{ lb/in}^3$$

In the above equation, p and V denote density and volume fraction, respectively. The subscripts c, m, and f denote composite, matrix, and fiber, respectively.

Similarly for conductivity and specific heat:

$$k_c = k_m V_m + k_f V_f = (0.087 \text{ BTU/ft·h·° F.})(0.7) + (6.4 \text{ BTU/ft·h·° F.})(0.3) = 1.9 \text{ BTU/ft·h·° F.}$$

$$C_c = C_m V_m + C_f V_f = (38 \text{ BTU/lbm·° F.})(0.7) + (25 \text{ BTU/lbm·° F.})(0.3) = 34 \text{ BTU/lbm·° F.}$$

The following assumptions were used in the thermal analysis of the product:
Inlet temperature=70° F.
Inlet pressure=40 psi
Inlet water flow rate≥27 gal/min
Thermal Rating=201.3 kW In the practical embodiment, the following properties were considered appropriate for the proper functioning of the composite material:
Density: 0.0516 lb/in³
Specific Heat: 0.341 Btu/lb-° F.
Thermal Conductivity: 1.98 Btu/ft-h-° F.

Other percentages of carbon fiber/phenolic epoxy are also possible, as will be evident to those of skill in the art.

Figure 5:
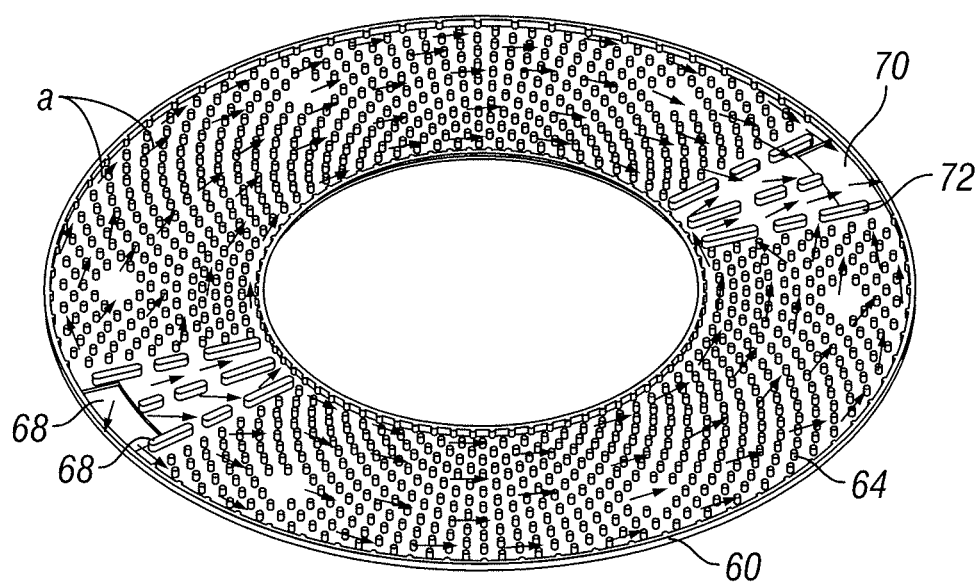
FIG. 5 is a diagram illustrating the flow of coolant through a removable heat transfer insert of the present invention.

Referring now to FIG. 5, the flow of water is shown through channel 68 formed between ridges 66 and thence, in a generally circular direction along the reverse face of removable composite heat transfer insert 60, as indicated by arrows "a," all as discussed above in connection with FIG. 4. It will be appreciated that the liquid coolant (water, in this example) dissipates some portion of the heat transferred by conduction from wear plate 48. The heated water flows out of brake 10 through channel 70 formed by ridges 72.

Figure 6:
FIG. 6 is a thermal profile of a removable heat transfer insert of the present invention.

FIG. 6 is a grayscale image depicting a thermal plot of removable composite heat transfer insert 60 when brake 10 is in use. Referring back for a moment to FIG. 5, water flows through and around nubs 64 and onto removable composite heat transfer insert 60. The lighter shades on FIG. 6 depict the higher temperature areas of removable composite heat transfer insert 60, while the darker shades indicate the lower temperature areas. It will be appreciated from FIG. 6 that the areas of high temperature are primarily confined to outer peripheral edge 74 of removable composite heat transfer insert 60, and that the body of heat transfer insert 60 is relatively cooler, as indicated by the darker shades of gray in the Figure. It will also be appreciated that removable composite heat transfer insert 60 possesses a relatively uniformly low temperature due to the action of the water circulating thereby.

A test was run to compare the thermal properties of a heat transfer insert made of the aforementioned composite material with known steel inserts cooled by water. The following table presents the results of the test:

| Working condition | Max temperature (steel section) | Max temperature (composite section) | Max temperature (overall) | Max temperature (overall) |
|---|---|---|---|---|
| Max flow rate (66 gal/min) | 147° F. | 155° F. | 436° F. | 437° F. |
| 120° F. outlet temperature | 174° F. | 180° F. | 459° F. | 463° F. |

Other materials may be substituted for the carbon fiber/phenolic epoxy composite material as will be suggested to those of skill in the art. Key qualities in selecting materials for use as removable composite heat transfer insert 60 include moldability, repeatability, dimensional stability, low cost, rigidity, non-galvanic, and non-metallic.

In the illustrated embodiment, pressure plate 26, reaction plates 32, 36, and mounting flange 40 are made of steel. Persons of skill in the art will recognize that pressure plate 26, reaction plates 32, 36, mounting flange 40, and removable composite heat transfer insert 60 do not generate a galvanic couple, as they do not constitute dissimilar materials. Hence, removable composite heat transfer insert 60 is not subject to galvanic corrosion, unlike known inserts, which consist of steel. It will, of course, be appreciated that if a liquid coolant such as glycol or oil is used, no galvanic action occurs between pressure plate 26, reaction plates 32, 36, and mounting flange 40 and composite heat transfer insert 60.

While nubs 64 are not subject to galvanic corrosion, as composite heat insert 60 is not made of steel, nubs 64 will erode as coolant comes into contact therewith. It will also be appreciated that removable composite heat transfer insert 60 may be easily replaced as nubs 64 wear away, degrading the heat transfer capabilities of removable composite heat transfer insert 60. Repair is a simple matter of opening housing 16 of brake 10 and replacing removable composite heat transfer inserts 60 throughout. No expensive and time-consuming sand-blasting and welding need be performed in the repair operation. A brake unit in accord with the present invention may accordingly be easily and quickly repaired on-site, as no special tools or machining equipment is needed to replace removable composite heat transfer insert 60. When brake unit 10 is used in a remote location, such as on a drill rig at a remote site, brake unit 10 can be quickly and easily repaired with a minimum of down-time.

The foregoing description of embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

The invention claimed is:

1. A brake for a rotating member, said brake used with a liquid coolant, comprising:
   a housing for containing said liquid;
   a stationary element disposed in said housing;
   a wear plate disposed on said stationary element;
   a friction element coupled to said rotating member for contacting said wear plate; and
   a removable heat transfer insert disposed adjacent said wear plate and in fluid communication with said liquid, said removable heat transfer insert consisting of a material not susceptible to galvanic corrosion.

2. The brake of claim 1; wherein said removable heat transfer insert consists of a non-metallic material.

3. The brake of claim 1; wherein said removable heat transfer insert consists of a carbon fiber/phenolic epoxy composite material.

4. The brake of claim 1; wherein said removable heat transfer insert consists of a composite material comprising about 30% carbon fiber and about 70% phenolic epoxy.

5. The brake of claim 1; wherein said removable heat transfer insert consists of a composite material comprising at least about 20% but less than about 40% carbon fiber and at least about 60% but less than about 80% phenolic epoxy.

6. The brake of claim 1; wherein said removable heat transfer insert is an annular member.

7. The brake of claim 6; wherein said removable heat transfer insert has a surface in fluid communication with said liquid; and further comprising a plurality of nubs disposed about said surface.

8. The brake of claim 7; wherein said nubs are disposed in concentric circles about said surface of said removable heat transfer insert.

9. The brake of claim 8; and further comprising ridges disposed on said surface of said removable heat transfer insert for channeling said liquid through said nubs.

10. The brake of claim 1; and further comprising:
a plurality of friction elements;
a plurality of stationary elements;
a plurality of wear plates disposed on said plurality of stationary elements, said wear plates associated with said plurality of friction elements; and
a plurality of removable heat transfer inserts disposed adjacent said wear plates.

11. The brake of claim 10; and further comprising a pressure plate; and a piston for supplying axial force to said pressure plate.

12. A liquid-cooled brake for a rotating member comprising:
a housing for containing the liquid;
a mounting flange for said housing;
first and second mounting elements disposed in said housing;
a pressure plate disposed in said housing;
a wear plate disposed on each of said mounting elements;
a plurality of friction elements coupled to said rotating member for contacting said wear plates;
a removable composite heat transfer insert disposed adjacent each of said wear plates and in fluid communication with said liquid, said removable composite heat transfer inserts consisting of a carbon fiber/phenolic epoxy composite material; and
a piston for axial movement of said pressure plate and said first and second mounting elements.

13. The brake of claim 12; wherein said removable composite heat transfer insert consists of composite material comprising about 30% carbon fiber and about 70% phenolic epoxy.

14. The brake of claim 13; wherein said removable composite heat transfer insert consists of a composite material comprising at least about 20% but less than about 40% carbon fiber and at least about 60% but less than about 80% phenolic epoxy.

15. The brake of claim 12; wherein each of said removable composite heat transfer inserts is of a generally annular shape.

16. The brake of claim 15; wherein each of said removable composite heat transfer inserts has an obverse face for contacting said wear plate and a reverse face;
and further comprising a plurality of nubs disposed on said reverse face, said nubs having a generally uniform diameter and height, said nubs arranged in a field of generally concentric circles.

17. The brake of claim 16; and further comprising a plurality of ridges on said reverse face of said removable composite heat transfer insert aligned in a generally diametric direction for channeling said liquid across said reverse face of said removable composite heat transfer insert.

18. A removable heat transfer insert for a brake for a rotating member, said brake used with a liquid coolant and having a housing for containing said liquid, a stationary element disposed in said housing, a wear plate disposed on said stationary element, and a friction element coupled to said rotating member for contacting said wear plate;
the removable heat transfer insert disposed adjacent said wear plate and in fluid communication with said liquid;
said removable heat transfer insert consisting of a material not susceptible to galvanic corrosion.

19. The removable heat transfer insert of claim 18; wherein said removable heat transfer insert consists of a non-metallic material.

20. The removable heat transfer insert of claim 18; wherein said removable heat transfer insert consists of a carbon fiber/phenolic epoxy composite material.

21. The removable heat transfer insert of claim 18; wherein said removable heat transfer insert consists of composite material comprising about 30% carbon fiber and about 70% phenolic epoxy.

22. The removable heat transfer insert of claim 18; wherein said removable heat transfer insert consists of a composite material comprising at least about 20% but less than about 40% carbon fiber and at least about 60% but less than about 80% phenolic epoxy.

* * * * *